US010354156B2

(12) United States Patent
Nishimura et al.

(10) Patent No.: US 10,354,156 B2
(45) Date of Patent: Jul. 16, 2019

(54) LIMITING SPEED DISPLAY DEVICE FOR VEHICLE

(71) Applicant: TOYOTA JIDOSHA KABUSHIKI KAISHA, Toyota-shi, Aichi (JP)

(72) Inventors: Naoki Nishimura, Nagoya (JP); Yoshiya Iwaki, Toyota (JP); Remi Delefosse, Brussels (BE); Paul Girond, Brussels (BE); Christophe Gillet, Brussels (BE)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 227 days.

(21) Appl. No.: 15/433,440

(22) Filed: Feb. 15, 2017

(65) Prior Publication Data
US 2017/0349097 A1    Dec. 7, 2017

(30) Foreign Application Priority Data

Jun. 2, 2016   (JP) .................. 2016-110833

(51) Int. Cl.
*B60R 1/00*     (2006.01)
*G06K 9/00*     (2006.01)

(52) U.S. Cl.
CPC ................ *G06K 9/00818* (2013.01)

(58) Field of Classification Search
CPC .......... G06K 9/00798; G06K 9/00818; G06K 9/00791; G06K 9/00825; G06K 9/00805; G06K 9/6201; G06K 9/6215; G06K 2209/27; G06K 9/3258; G06K 9/78; G08G 1/09623; G08G 1/167; G08G 1/096725;

(Continued)

(56) References Cited

U.S. PATENT DOCUMENTS 6,721,634 B1    4/2004   Hauler et al.
2008/0167819 A1*  7/2008  Breed ............... G08G 1/161
                                                   701/300

(Continued)

FOREIGN PATENT DOCUMENTS

CN    103832282 A    6/2014
JP    2003-512230 A   4/2003

(Continued)

OTHER PUBLICATIONS

Feb. 22, 2019 Office Action issued in Chinese Patent Application No. 201710407642.7.

*Primary Examiner* — Zaihan Jiang
*Assistant Examiner* — Samuel D Fereja
(74) *Attorney, Agent, or Firm* — Oliff PLC

(57) ABSTRACT

A limiting speed display device for vehicle includes a position information receiver, map display device for displaying map image, imaging device, display device for road sign image, limiting speed information determining device, road attribute information determining device, country information acquiring device, limiting speed estimation device, and limiting speed display device. The limiting speed estimation device estimates limiting speed for the road based on country information and road attribute information when the limiting speed information determining device determines that the limiting speed information is not included and the road attribute information determining device determines that the road attribute information is included.

6 Claims, 13 Drawing Sheets

(58) Field of Classification Search
CPC .. G08G 1/0112; G08G 1/096805; G08G 1/09; G08G 1/093; G08G 1/09626; G08G 1/096716; G08G 1/0968; G08G 1/096783; G08G 1/056; G08G 1/0962; G08G 1/096741; G08G 1/0133; G08G 1/16; G08G 1/165; G08G 1/017; G08G 1/095; G08G 1/096791; G08G 1/0969; G08G 1/161; G08G 1/163; G08G 1/166; G08G 1/096855; G01C 21/32; G01C 21/3407; G01C 21/14; G01C 21/3623; G01C 21/3644; G01C 21/3691; G01C 21/165; G01C 21/34; G01C 21/3476; G01C 21/36; G01C 21/3602; G01C 21/26; G01C 21/30; G01C 21/3679; G01C 21/3611; B60W 2420/42; B60W 2710/20; B60W 2710/18; B60W 2720/10; B60W 30/14; B60W 30/146; B60W 2050/146; B60W 2550/10; B60W 40/02; B60W 50/14; B60W 2550/12; B60W 2550/402; B60W 30/09; B60W 10/18; B60W 2050/0077; B60W 2050/0078; B60W 30/0956; B60W 30/12; B60W 30/18154; B60W 30/18163; B60W 40/06; B60W 50/08; B60W 2550/22; B60W 30/18; B60W 30/00; B60W 10/20; B60W 10/04; B60W 2050/0095; B60W 2050/143; B60W 2420/52; B60W 2520/06; B60W 2520/10; B60W 2550/14; B60W 2550/141; B60W 2550/142; B60W 2550/143; B60W 2550/146; B60W 2710/207; B60W 40/04; G05D 1/0088; G05D 2201/0213; G05D 1/0246; G05D 1/0251; G05D 1/0278; G05D 1/0221; G05D 1/0253; G05D 1/0287; G05D 1/0238; G05D 1/0276; G05D 1/0212; G05D 1/0219; B62D 15/025; B62D 6/00; G06T 2207/20081; G06T 7/00; G06T 11/60; G06T 7/602; G06T 7/62; G06T 2207/30256; G06T 2207/30261; G06F 17/30241; G06F 17/30377; G06F 3/14; H04L 67/12; G01S 19/10; G01S 19/42; G01S 19/13; G01S 19/39; G01S 19/48; G01S 5/16; B60K 35/00; B60K 2350/352; B60K 2350/1076; B60K 2350/1096; B60K 2350/965; B60K 2350/2052; B60K 31/00; B60K 37/00; B60R 1/00; B60R 11/04; B60R 2300/80; B60R 2300/802; B60R 11/0229; B60R 230/00; B60R 2300/301; B60R 16/02; B60R 16/023; B60R 2300/205; B60R 2300/207; B60R 2300/308; B60R 230/804; B60R 2300/8093; H04N 7/183; H04N 1/00244; H04N 2101/00; H04N 2201/0084; H04N 7/185; H04N 7/181

See application file for complete search history.

(56) References Cited

U.S. PATENT DOCUMENTS

| | | | |
|---|---|---|---|
| 2012/0253628 A1 | 10/2012 | Maruyama | |
| 2012/0303222 A1* | 11/2012 | Cooprider | B60W 10/06 701/48 |
| 2015/0035981 A1* | 2/2015 | Otsuki | G08G 1/09623 348/148 |
| 2017/0178591 A1* | 6/2017 | Takatsudo | B60K 35/00 |

FOREIGN PATENT DOCUMENTS

| | | |
|---|---|---|
| JP | 2010-079449 A | 4/2010 |
| JP | 2012-206594 A | 10/2012 |
| JP | 2012-224247 A | 11/2012 |
| JP | 2013-019680 A | 1/2013 |
| JP | 2015-028738 A | 2/2015 |

* cited by examiner

| Country / Road attribute | Main lane of highway | General road |
|---|---|---|
| Japan | 100km/h | 60km/h |

FIG.17

| Road attribute / Country | Motorway | Expressway | Non-urban road | Urban road |
|---|---|---|---|---|
| Belgium | 120km/h | 120km/h | 90km/h | 50km/h |
| France | 130km/h | 110km/h | 90km/h | 50km/h |

87

LIMITING SPEED DISPLAY DEVICE FOR VEHICLE

BACKGROUND OF THE INVENTION

1. Field of the Invention

The present invention relates to a limiting speed display device for a vehicle that has display means capable of showing a limiting speed for a road on which a vehicle runs.

2. Description of the Related Art

There is known a vehicle that has a camera and display means for road sign image capable of displaying image representing a road sign imaged by the camera.

When the camera images a road sign set along a road where this vehicle is running, the camera generates a picked up image data corresponding to this road sign. The road sign image represented by this picked up image data is displayed on the display means for road sign image.

As is well known, some of road signs represent a limiting speed of a vehicle for a road.

When the camera images a road sign representing a limiting speed, a road sign image corresponding to this road sign is displayed on the display means for road sign image.

A driver of the vehicle can recognize the limiting speed for the road on which this vehicle is running by looking at the road sign image that represents the limiting speed and is displayed on the display means for road sign image.

It should be noted that Japanese Unexamined Patent Application Publication No. 2010-79449 discloses a background technology related to the present invention.

SUMMARY OF THE INVENTION

There are a lot of types of road signs, and there are many road signs that do not represent a limiting speed.

When the camera images a road sign that does not represent a limiting speed and a road sign image corresponding to this road sign is displayed on the display means for road sign image, the driver of the vehicle cannot recognize the limiting speed for the road, on which this vehicle is running, by looking at the display means for road sign image.

The limiting speed for each road of each country is determined to a constant value based on the attribute of the road. For example, the traffic law of Japan stipulates that the limiting speed of each of the general roads is 50 km/h and that the limiting speed of each of main lanes of highways is 100 km/h.

Even if a road sign image representing the limiting speed is not displayed on the display means for road sign image of the vehicle running on a road in Japan, the driver, who knows the limiting speed for each road of Japan, does not have difficulty in driving the vehicle while obeying the limiting speed.

However, unless the road sign image representing the limiting speed is displayed on the display means for road sign image of the vehicle running on the road in Japan, the driver, who does not know the traffic law of Japan, may have difficulty in driving the vehicle.

For example, when the driver does not reside in Japan (for example, the driver is not Japanese), this problem is likely to occur.

Incidentally, a car navigation system mounted on a vehicle is conventionally known. As is well known, the car navigation system is provided with map display means that displays and scrolls map image representing geographic information on the road on which the vehicle is running and surrounding area of this road.

Furthermore, image data, which represents a road image in the map image of some of the car navigation systems, includes information representing the limiting speed for the road corresponding to this road image (see, for example, Japanese Unexamined Patent Application Publication No. 2012-224247).

The car navigation system, in which image data representing a road image in a map image includes information representing a limiting speed, and the display means for road sign image can be configured to communicate data therebetween.

When the road sign image representing the limiting speed is not displayed on the display means for road sign image, the information representing the limiting speed contained in the image data representing the road image in the map image can be sent to the display means for road sign image, thereby this limiting speed can be displayed on the display means for road sign image.

However, some of car navigation systems have image data, which represents a road image in a map image, does not include information representing a limiting speed. When the vehicle is provided with such car navigation systems, the display means for road sign image cannot display the limiting speed using the information in the image data representing the map image.

The present invention has been made to cope with the above problems, and has an object to provide a limiting speed display device for a vehicle capable of displaying a limiting speed for a road on which a vehicle is running when information on a limiting speed for the road cannot be obtained from a map image data representing a map image and a road sign image data representing a road sign image displayed on display means for road sign image.

In order to achieve the object, a limiting speed display device for vehicle of the present invention comprises a position information receiver (61), map display means, imaging means (51), display means for road sign image (20), limiting speed information determining means (50), road attribute information determining means (50), country information acquiring means (50), limiting speed estimation means (50), and limiting speed display means (20).

The position information receiver is capable of receiving position information on the targeted vehicle, the position information transmitted from a satellite of a global navigation satellite system.

The map display means for displaying map image (62) includes image representing a road (80) on which the targeted vehicle runs by using the position information.

The imaging means for generating picked up image data corresponds to a road sign (84) when imaging the road sign.

The memory records a plurality of road sign image data. Each of the road sign image data represents each of road sign images (27A, 27B, 27C, 27E, 27F, 27G, 27I, 27J, 27K, 27L). Each of the road sign images corresponds to each of the road signs.

The display means for road sign image displays the road sign image represented by a coincident data that is one of the road sign image data when the coincident data is coincident with the picked up image data generated by the imaging means.

The limiting speed information determining means determines whether or not limiting speed information that is information on limiting speed of the vehicle for road is included in at least one of map image data representing the map image and the road sign image data representing the road sign image displayed on the display means for road sign image.

The road attribute information determining means determines whether or not road attribute information that is information on attribute of the road is included in at least one of the map image data and the road sign image data representing the road sign image displayed on the display means for road sign image.

The country information acquiring means acquires country information that is information on a country where the road is installed based on one of the picked up image data and the position information.

The limiting speed estimation means estimates limiting speed for the road based on the country information and the road attribute information when the limiting speed information determining means determines that the limiting speed information is not included and the road attribute information determining means determines that the road attribute information is included.

The limiting speed display means displays the limiting speed estimated by the limiting speed estimation means.

When the map image data includes the limiting speed information, it is technically possible to configure the limiting speed display device for vehicle so that this limiting speed information is transmitted to the display means for road sign image and the limiting speed represented by this limiting speed information is displayed on the display means for road sign image.

The map image including image representing the road where the targeted vehicle runs is displayed on the map display means. On the other hand, the imaging means generates the picked up image data corresponding to a road sign when imaging the road sign. Further, the memory records a plurality of road sign image data. Each of the road sign image data represents each of road sign images. Each of the road sign images corresponds to each of the road signs.

Further, limiting speed information that is information on limiting speed of the vehicle for the road may be included in at least one of the map image data, which represents the map image, and the road sign image data, which represents the road sign image displayed on the display means for road sign image.

For example, when the road sign image data includes the limiting speed information, occupant of the targeted vehicle can recognize the limiting speed for the road, on which the targeted vehicle is running, by looking at the road sign image displayed on the display means for road sign image.

When the map image data includes the limiting speed information, the occupant of the targeted vehicle can recognize the limiting speed for the road, on which the targeted vehicle is running, by transmitting this limiting speed information to the display means for road sign image and making the display means for road sign image show the limiting speed represented by this limiting speed information.

On the other hand, the map image data representing the map image displayed on the map display means, which is mounted on the targeted vehicle, and the road sign image data representing the road sign image displayed on the display means for road sign image may not include the limiting speed information.

In this case, the display means for road sign image cannot display the limiting speed by using at least one of the map image data representing the map image and the road sign image data representing the road sign image displayed on the display means for road sign image.

However, in the present invention, when the limiting speed information is not included in both the map image data representing the map image and the road sign image data representing the road sign image displayed on the display means for road sign image, and the road attribute information determining means determines that the road attribute information is included, the limiting speed estimation means estimates the limiting speed for the road based on the country information acquired by the country information acquiring means and the road attribute information, and the limiting speed display means displays the estimated limiting speed.

Then, the occupant of the targeted vehicle can recognize the limiting speed for the road, on which the targeted vehicle is running, by looking at the limiting speed display means.

In one of aspects of the present invention, the limiting speed display means is the display means for road sign image.

When the present invention is carried out as this embodiment, the occupant of the targeted vehicle can recognize the limiting speed by looking at one display, regardless of whether or not the road sign image data, which represents the road sign image displayed on the display means for road sign image, includes the limiting speed information.

In other words, the occupant of the targeted vehicle does not have to select the display means to look at from two display means in order to recognize the limiting speed, regardless of whether or not the road sign image data representing the road sign image displayed on the display means for road sign image includes the limiting speed information.

In one of aspects of the present invention, the limiting speed information determining means is configured to determine that the limiting speed information is not included in the road sign image data representing the road sign image displayed on the display means for road sign image when the imaging means images the road sign (84C, 84D) indicating that restriction on the limiting speed for the road ends.

When the present invention is carried out as this embodiment, for example, when the imaging means of the targeted vehicle, which is running on a general road of Japan, images a road sign representing that the restriction on limiting speed of 50 km/h is finished, the limiting speed information determining means determines that "the limiting speed information is not included in the road sign image data".

When the limiting speed information determining means determines that "the limiting speed information is also not included in the map image data", the limiting speed estimated by the limiting speed estimation means is displayed on the limiting speed display means.

In one of aspects of the present invention, the limiting speed information determining means is configured to determine that the limiting speed information is not included in the road sign image data representing the road sign image displayed on the display means for road sign image when the imaging means images the road sign (84H, 84I) indicating the road attribute information for the road.

When the present invention is carried out as this embodiment, for example, when the imaging means of a targeted vehicle, which is running on a general road of Europe, images the road sign representing that a Motorway exists in front of the targeted vehicle, the limiting speed information determining means determines that "the limiting speed information is not included in the road sign image data".

When the limiting speed information determining means determines that "the limiting speed information is also not included in the map image data", the limiting speed estimated by the limiting speed estimation means is displayed on the limiting speed display means.

In one of aspects of the present invention, the targeted vehicle is provided with an adaptive cruise control controller (30) for controlling the targeted vehicle so as to follow a leading vehicle (90) with speed equal to or less than a predetermined setting limiting speed while maintaining a predetermined inter-vehicle distance with respect to the leading vehicle when the leading vehicle running on the road is positioned in front of the targeted vehicle. The adaptive cruise control controller is configured to use the limiting speed estimated by the limiting speed estimation means as the setting limiting speed.

When the present invention is carried out as this embodiment, since the adaptive cruise control controller uses the limiting speed estimated by the limiting speed estimation means as the setting limiting speed, the occupant of the targeted vehicle does not have to set the setting limiting speed.

In the above description, references used in the following descriptions regarding embodiments are added with parentheses to the elements of the present invention, in order to understand the invention. However, those references should not be used to limit the scope of the present invention. Other objects, other features, and accompanying advantages of the present invention are easily understood from the description of embodiments of the present invention to be given referring to the following drawings.

BRIEF DESCRIPTION OF THE DRAWINGS

FIG. 12 is a view showing a map for estimating limiting speed for Japan.

FIG. 17 is a view showing a map for estimating limiting speed for Belgium and France.

DETAILED DESCRIPTION OF THE PREFERRED EMBODIMENTS

A limiting speed display device for vehicle according to a first embodiment of the present invention will be described hereinafter with reference to the FIGS. 1 through 14.

A road 80, which is described later in the description of the first embodiment, is installed in Japan.

Figure 1:
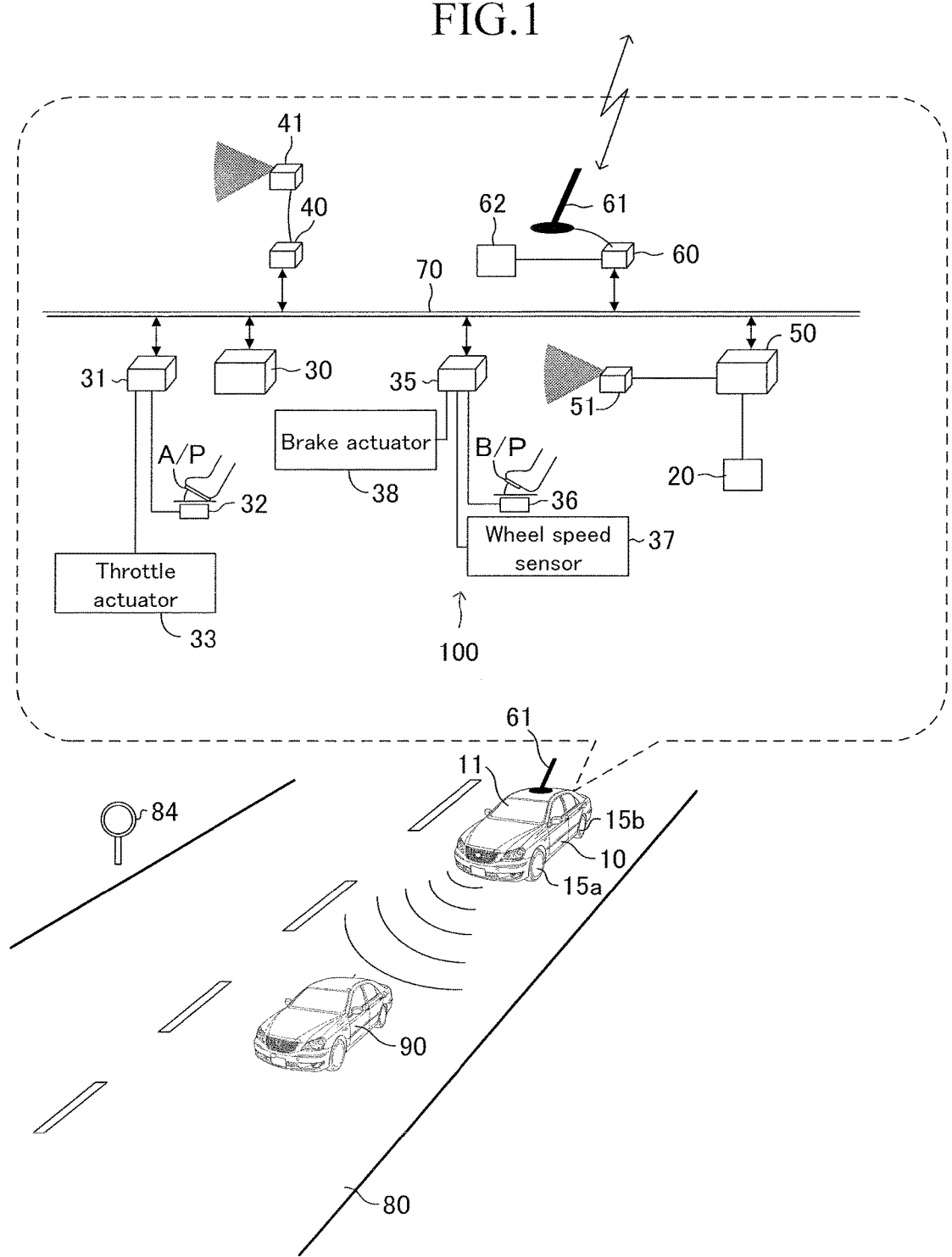
FIG. 1 is a view showing a targeted vehicle equipped with a limiting speed display device for a vehicle according to a first embodiment of the present invention, a leading vehicle and a road where these vehicles are running.

As shown in FIG. 1, the limiting speed display device for vehicle 100 according to the embodiment of the present invention is installed to a vehicle 10 (hereinafter, it is referred to as a targeted vehicle 10).

The limiting speed display device for vehicle 100 is provided with a vehicle control ECU 30, an engine control ECU 31, a brake control ECU 35, a first display means 20, a sensor ECU 40, a radar sensor 41, a camera control ECU 50, a camera 51, a GPS control ECU 60, a GPS receiver 61, and a second display means 62, all of which will be described later.

Figure 2:
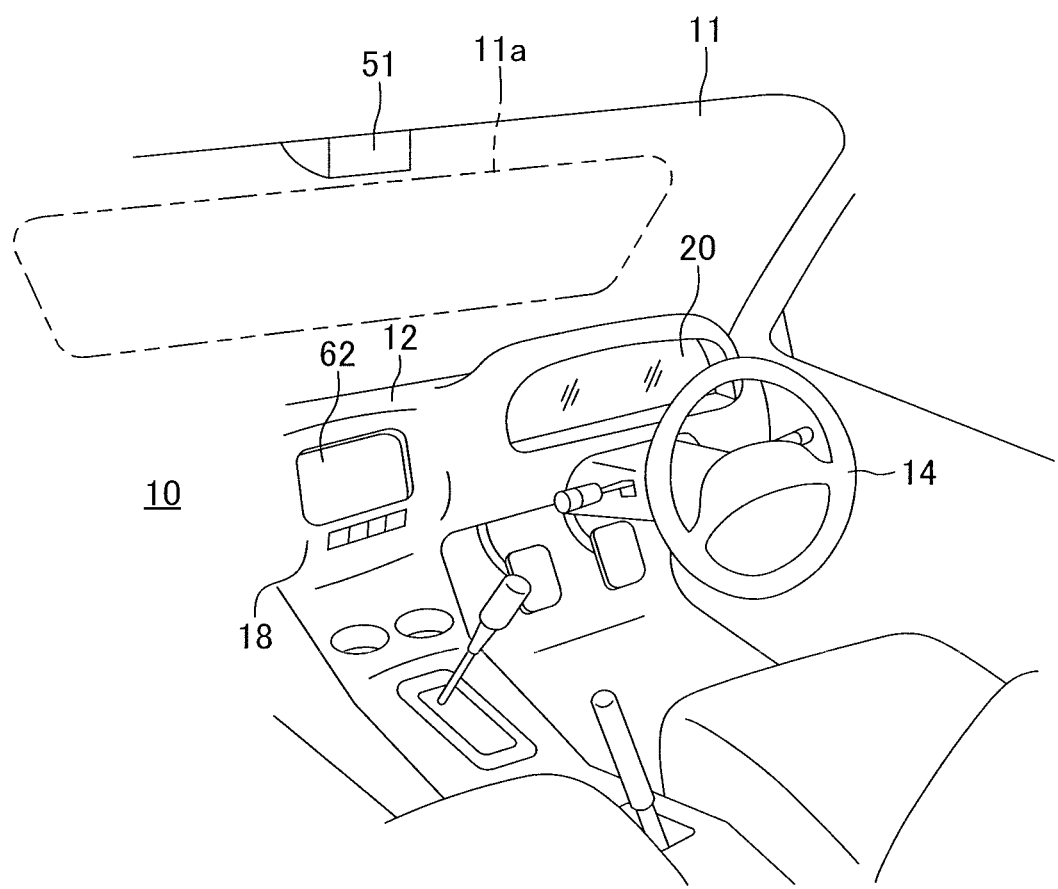
FIG. 2 is a view showing the inside of the targeted vehicle and a front window of the targeted vehicle.

As shown in FIGS. 1 and 2, the targeted vehicle 10 is provided with a front window 11 that is made of a translucent material.

Furthermore, as shown in FIG. 2, a portion of a front surface of an interior space of the targeted vehicle 10 is composed of a dashboard 12 located below the front window 11. A steering wheel 14 is rotatably supported by a right side portion of the dashboard 12. As is well known, when rotating the steering wheel 14, steering angles of left and right front wheels 15a of the targeted vehicle 10, which is shown in FIG. 1, are changed.

Additionally, a part of the dashboard 12 is composed of an instrument panel 18. The first display means 20 composed of a liquid crystal display is fixed to a right side portion of the instrument panel 18. As shown in FIG. 2, the first display means 20 has a substantially rectangular shape having a lateral dimension (i.e., dimension in a left and right direction) longer than its vertical dimension.

As shown in FIGS. 7 through 11, a substantially rectangular main display area 21 is formed in a part of the first display means 20.

Figure 7:
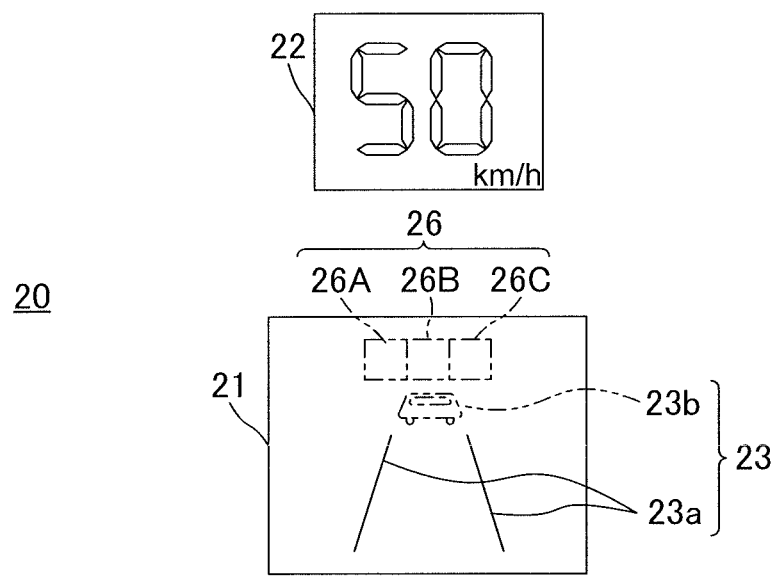
FIG. 7 is a schematic view of a first display means.

Furthermore, as shown in FIG. 7, a sub display area 22 is formed on the display means 20. The sub display area 22 is located directly above the main display area 21.

A white line and leading vehicle recognition status display part 23 and a sign display unit 26 located immediately above the white line and leading vehicle recognition status display part 23 are provided on the main display area 21.

The sign display unit 26 is provided with three display parts that are arranged in the lateral direction. In other words, the sign display unit 26 has a left side display part 26A, a central display part 26B, and a right side display part 26C.

It should be noted that types of images showed by the line and leading vehicle recognition status display part 23 and the sign display unit 26 will be described later.

As shown in FIG. 1, the targeted vehicle 10 is equipped with the vehicle control ECU 30, the engine control ECU 31, the brake control ECU 35, the sensor ECU 40, the camera control ECU 50, and the GPS control ECU 60. These ECUs can exchange data with each other (i.e., these ECUs can communicate with each other) via a communication and sensor systems CAN (Controller Area Network) 70. Noted that ECU is an abbreviation of electric control unit. Each of the ECUs is an electronic control circuit. Each of the ECUs is provided with a microcomputer including a CPU, a ROM, a RAM, an interface and the like, as main components. The CPU achieves a variety of functions described later by executing instructions stored in a memory (ROM).

A accelerator operation quantity sensor 32 is connected to the engine control ECU 31. The accelerator operation quantity sensor 32 detects an operation amount of the accelerator pedal A/P and outputs a signal representing the operation amount AP to the engine control ECU 31. Further, a throttle actuator 33 as an engine actuator is connected to the engine control ECU 31. The throttle actuator 33 is a device that changes an open degree of a throttle valve provided in the intake duct of an engine (not shown) of the targeted vehicle 10 by driving the throttle valve.

The engine control ECU 31 operates the throttle actuator 33 based on the accelerator operation quantity AP detected by the accelerator operation quantity sensor 32 of the targeted vehicle 10 and an operating state quantity (for example, engine rotation speed) detected by an engine state quantity sensor (not shown) of the targeted vehicle 10. When the throttle actuator 33 is operated, a generated torque and an output of the engine change, thereby an acceleration of the targeted vehicle 10 changes.

A brake operation quantity sensor 36 and a wheel speed sensors 37 are connected to the brake control ECU 35.

The brake operation quantity sensor 36 detects an operation quantity BP of a brake pedal B/P and outputs a signal representing an operation quantity BP to the brake control ECU 35.

The wheel speed sensors 37 is actually provided to each of the front wheels 15a and each of rear wheels 15b respectively. The wheel speed sensors 37 outputs a signal indicating the rotation speed of each of the front wheels 15a and the rotation speed of each of the rear wheels 15b to the brake control ECU 35.

Furthermore, a brake actuator 38 is connected to the brake control ECU 35. The brake actuator 38 is provided in a hydraulic circuit between a master cylinder that pressurizes hydraulic fluid by a pedaling force of the brake pedal B/P and a friction brake mechanism provided to each of the front. wheels 15a and each of the rear wheels 15b. The friction brake mechanism presses a brake pad against the brake disk provided in each of the front wheels 15a and each of the rear wheels 15b to generate a hydraulic braking force by activating a wheel cylinder using the hydraulic pressure of the hydraulic fluid supplied from the brake actuator 38. The brake actuator 38 is a well-known actuator for adjusting the hydraulic pressure of the hydraulic fluid to be supplied to the wheel cylinder. The brake actuator 38 supplies a hydraulic pressure according to a command from the brake control ECU 35 to the wheel cylinder to generate a braking force on each wheel.

The brake control ECU 35 operates the brake actuator 38 based on the operation quantity BP detected by the brake operation quantity sensor 36 and the operating state quantity detected by an operating state sensor (not shown) of the targeted vehicle 10. When the brake actuator 38 is operated, braking force is applied to each of the front wheels 15a and each of rear wheels 15b, thereby the targeted vehicle 10 decelerates. Then, also in this case, the acceleration of the targeted vehicle 10 changes.

As shown in FIG. 1, the sensor ECU 40 is connected to the radar sensor 41. The radar sensor 41 is a well-known millimeter wave radar sensor. The radar sensor 41 transmits a millimeter wave forward from the targeted vehicle 10 in accordance with instructions of the sensor ECU 40. The millimeter wave is reflected rearward by an object that is located in front of the targeted vehicle 10. For example, when a leading vehicle 90 (see FIG. 1), which is positioned in front of the targeted vehicle 10, is running on the road 80 on which the targeted vehicle 10 is running, the millimeter wave is reflected rearward by the leading vehicle 90. Then, the reflected wave is received by the radar sensor 41.

A switch for ACC (Adaptive Cruise Control) (not shown) is provided on the instrument panel 18 of the targeted vehicle 10. This switch for ACC is connected to the vehicle control ECU 30. When the switch for ACC is at the OFF position, a traveling mode of the targeted vehicle 10 is in a normal traveling mode. In the normal traveling mode, the engine control ECU 31 controls the throttle actuator 33 according to the accelerator pedal operation amount PA, and the brake control ECU 35 controls the brake actuator 38 based on the brake operation amount PB. The targeted vehicle 10 runs in accordance with the driving operation of the driver.

When an occupant of the targeted vehicle 10 operates switch for ACC in order to change its position to the ON position, the traveling mode of the targeted vehicle 10 becomes a following traveling mode. In the following traveling mode, the targeted vehicle 10 runs so as to follow the leading vehicle 90 located in front thereof.

When the traveling mode of the targeted vehicle 10 is in the following traveling mode, the detected wave information received by the radar sensor 41 is transmitted to the vehicle control ECU 30 via the sensor ECU 40. Then, the vehicle control ECU 30 calculates a inter-vehicle distance L between the targeted vehicle 10 and the leading vehicle 90 based on the detected wave information. Further, the vehicle control ECU 30 acquires (calculates) a vehicle speed Vj of the targeted vehicle 10 based on signal from the wheel speed sensors 37 and calculates a inter-vehicle time Tj (=the inter-vehicle distance L/a own vehicle speed Vj).

Further, the vehicle control ECU 30 calculates a targeted acceleration, which is the acceleration for zeroing the difference between the calculated inter-vehicle time Tj and a predetermined targeted inter-vehicle time Ttgt, as a FB required G (a feedback required acceleration) based on the inter-vehicle time Tj and the predetermined targeted inter-vehicle time Ttgt. The targeted inter-vehicle time Ttgt is a value obtained by dividing the targeted inter-vehicle distance Ltgt by the own vehicle speed Vj. In other words, the vehicle control ECU 30 calculates the FB required G to zero the difference between the inter-vehicle distance L and the targeted inter-vehicle distance Ltgt. It should be noted that the targeted inter-vehicle time Ttgt may be a constant value or may be a variable value that is selected (set) when the occupant of the targeted vehicle 10 operates a setting switch (not shown).

Furthermore, the vehicle control ECU 30 transmits a request command signal based on the calculated FB required G to the engine control ECU 31 and the brake control ECU 35 via the CAN 70. Upon receiving the request command signal, the engine control ECU 31 and the brake control ECU 35 control the throttle actuator 33 and the brake actuator 38, respectively, in accordance with the request command signal. This causes the acceleration of the targeted vehicle 10 to be controlled so as to be coincident with the FB required G. Therefore, the inter-vehicle distance L between the targeted vehicle 10 and the leading vehicle 90 becomes the target inter-vehicle distance Ltgt.

However, the vehicle control ECU 30 controls the targeted vehicle 10 so that the speed of the targeted vehicle 10 is less than or equal to the setting limiting speed when the traveling mode of the targeted vehicle 10 is in the following traveling mode.

This setting limiting speed can be set by operating a setting limiting speed input means (not shown) provided on the instrument panel 18 by the occupant of the targeted vehicle 10. Namely, the setting limiting speed can be set to be a value desired by the occupant.

The vehicle control ECU 30 can set the setting limiting speed to an estimated limiting speed, which will be described later. That is, the vehicle control ECU 30 can automatically set the setting limiting speed.

Furthermore, when the radar sensor 41 of the targeted vehicle 10, whose switch for ACC is at the ON position, receives the millimeter wave, a drive support ECU (not shown) connected to the communication/sensor system CAN 70 determines that the leading vehicle 90 is positioned in front of the targeted vehicle 10. Then, the drive support ECU instructs the first display means 20 to display a leading vehicle recognition status. This causes the first display means 20 to display the leading vehicle image 23*b* (see the imaginary line in FIG. 7) on the white line and leading vehicle recognition status display part 23.

On the other hand, when the radar sensor 41 does not receive the millimeter waves, the first display means 20 does not display the leading vehicle image 23*b* on the white line and leading vehicle recognition status display part 23.

As shown in FIG. 1, the camera control ECU 50 is connected to the first display means 20 and the camera 51.

When the camera control ECU 50 receives the rotation speed information of each of the front wheels 15*a* and each of the rear wheels 15*b* acquired by the wheel speed sensors 37 from the brake control ECU 35, the camera control ECU 50 makes the sub display area 22 show (display) this rotation speed information as the vehicle speed of the targeted vehicle 10 (see FIG. 7).

As shown in FIG. 2, the camera 51 is fixed to the upper end portion of the interior side surface of the front window 11.

The camera 51 includes a lens and an image pickup device positioned immediately behind the lens (these are not shown). The image pickup device images photographing luminous flux (i.e., object image), which is a natural light reflected rearward by an object positioned in front of the targeted vehicle 10 and is passing through the front window 11 and the lens. The data imaged by the image pickup device are repeatedly transmitted to the camera control ECU 50 from the image pickup device at every predetermined time.

"Data for collating country code" and "a map for estimating limiting speed 86 (see FIG. 12)" are recorded on the memory of the camera control ECU 50.

As shown in FIG. 1, the GPS control ECU 60 is connected to the GPS receiver 61 and the second display means 62. As is well known, the GPS receiver 61 receives information on the position of the targeted vehicle 10 (hereinafter, it is referred to as "position information") at every predetermined time by receiving a GPS signal transmitted from a GPS satellite. The GPS receiver 61 transmits the obtained position information to the GPS control ECU 60. The GPS control ECU 60 time-serially records the received position information on its RAM.

As shown in FIG. 2, the second display means 62 is provided on the center of the instrument panel 18. Namely, the second display means 62 is a separate entity from the first display means 20 and is spaced to the left side from the first display means 20.

A "map image data" is recorded on the memory of the GPS control ECU 60.

THE GPS control ECU 60 reads the map image data from the memory and makes the second display means 62 show the map image represented by this map image data.

This map image data represents the map of Japan. This map image data includes the positions and the shapes of roads (including highways and general roads), buildings, rivers, mountains, and the like. Then, roads, buildings, rivers, mountains, etc. are displayed on the second display means 62.

Furthermore, the GPS control ECU 60 makes the second display means 62 show the map image in association with the position information received from the GPS receiver 61. That is, the current position of the targeted vehicle 10 and the map image of the surrounding area of the current position are displayed on the second display means 62. When the targeted vehicle 10 runs on the road 80, the second display means 62 displays the map image while scrolling it.

Image data, which represents some of the roads (it is referred to as a first special road) in the map image, includes the limiting speed information that represents the limiting speed of the vehicle for each of the roads.

On the other hand, image data representing the road other than the first special road in the map image does not include the limiting speed information.

In addition, image data, which represents some of the roads (it is referred to as a second special road) in the map image, includes a road attribute information that represents the attribute of each of the roads. The road attribute information represents the type of the corresponding road. In other words, the road attribute information indicates that the corresponding road is categorized as either "a main lane of a highway", "a different area from a main lane of a highway" or "a general road".

On the other hand, image data representing the road other than the second special road in the map image does not include the road attribute information.

When receiving the position information from the GPS receiver 61, the GPS control ECU 60 obtains a country code corresponding to the position information by applying the position information to the database that is recorded on its memory. This country code is transmitted from the GPS control ECU 60 to the camera control ECU 50. Then, the camera control ECU 50 specifies the country, in which the targeted vehicle 10 is located, based on the country code and the data for collating country code every time when the camera control ECU 50 obtains the country code. In other words, the camera control ECU 50 acquires the country information on the country where the targeted vehicle 10 is located.

When the camera 51 of the targeted vehicle 10 running with speed equal to or higher than the predetermined speed recognizes (images) a painted lane marking (a white line) on a road with a LDA (Lane Departure Alert) system installed to the targeted vehicle 10 be in a operation state, the drive support ECU gives an instruction to the display means 20 so as to show a white line recognition state. This causes the display means 20 to show left and right pair of the white lines 23a on the white line and leading vehicle recognition status display part 23 as shown in FIG. 7. For example, when the targeted vehicle 10 runs on a highway, the left and right pair of white lines 23a are displayed on the white line and leading vehicle recognition status display part 23.

As shown in FIG. 1, a number of the road signs 84 used in Japan (only one road sign 84 is shown in FIG. 1) are installed on the side of the road 80 at intervals.

As is well known, there are a variety of types of road signs 84. Each of the road signs 84 represents individual traffic information on the area where each of the road signs 84 is installed. In other words, the road signs 84 include a regulation sign, an instruction sign, a guide sign, and a warning sign. The regulation sign is a sign that prohibits or designates a specific traffic method. The instruction sign allows a specific traffic method. The guide sign is for guiding the vehicle. The warning sign notifies an occupant of vehicles about danger on a road and a situation which the occupant must be careful beforehand.

The regulation signs include, for example, a sign representing limiting speed, a sign representing No parking, a sign representing No entry, and a sign representing No overtaking.

The instruction signs include, for example, a Parking sign and a Stopping sign.

The guide signs include a sign representing the name of the place where this sign is installed, a sign representing the name of the road, and a sign representing the attribute of the road.

The warning signs include, for example, a Railroad crossing sign, a Number of lanes reduced sign, and a Road construction sign.

Furthermore, a road sign database having a large number of road sign image data is recorded on the memory of the camera control ECU 50.

The group having the plurality of the road sign image data in the road sign database is image data representing a road sign image corresponding to each of the road signs 84. The group having the plurality of the road sign image data includes a road sign image data, which corresponds to signs regulating limiting speed, and a road sign image data, which corresponds to signs that don't regulate limiting speed.

The road sign images corresponding to road signs (the regulation signs) regulating limiting speed are referred to as a limiting speed regulating sign images. The limiting speed regulating sign images include, for example, a 50 km/h limiting speed sign image 27A and a 100 km/h limiting speed sign image 27B, which will be described later (see FIGS. 8 and 9). In addition, the road signs corresponding to the limiting speed regulating sign images are referred to as a limiting speed regulating signs.

A display pattern is recorded on the memory of the camera control ECU 50.

The display pattern defines a correspondence relationship between each of the road sign images and each of the left side display part 26A, the central display part 26B, and the right side display part 26C. The correspondence relationship defined by the display pattern of the present embodiment is as follows: the left side display part 26A shows the road sign images corresponding to some of the regulation signs (for example, the No overtaking sign image 27E of FIG. 8), the central display part 26B shows the road sign images corresponding to some of the speed-related signs (for example, the limiting speed regulating sign including the 50 km/h limiting speed sign image 27A and the 100 km/h limiting speed sign image 27B), and the right side display part 26C shows the road sign images corresponding to speed-auxiliary signs.

The camera control ECU 50 determines whether or not the picked up image data received from the camera 51 include the image data coincident with the road sign image data in the road sign database by performing a pattern matching using the road sign database and the picked up image data.

Figure 3:
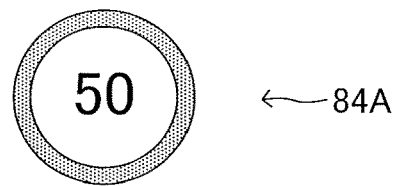
FIG. 3 is a view showing a road sign representing that the limiting speed is 50 km/h.
Figure 8:
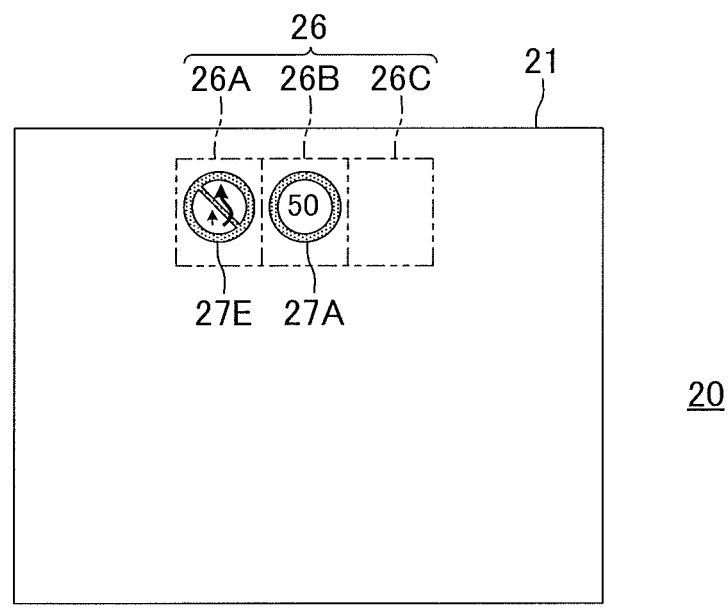
FIG. 8 is a view showing a main display area displaying a road sign image representing that the limiting speed is 50 km/h.

As a result, when the camera control ECU 50 determines that the picked up image data, which is generated by the camera 51 and represents a road sign 84, is coincident with the road sign image data representing the 50 km/h limiting speed sign 84A (see FIG. 3. The road sign representing the limiting speed for a general road in Japan) corresponding to the 50 km/h limiting speed sign image 27A in the road sign database, the camera control ECU 50 makes the central display part 26B of the sign display unit 26 show the 50 km/h limiting speed sign image 27A for a constant period of time in accordance with the display pattern as shown in FIG. 8.

Figure 4:
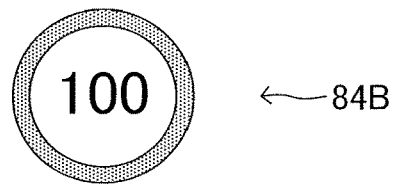
FIG. 4 is a view showing a road sign representing that the limiting speed is 100 km/h.

When the camera control ECU 50 determines that the picked up image data, which is generated by the camera 51 and represents a road sign 84, is coincident with the road sign image data representing the 100 km/h limiting speed sign 84B (see FIG. 4. The road sign representing the limiting speed for the main lane of the highway in Japan) corresponding to the 100 km/h limiting speed sign image 27B in the road sign database, the camera control ECU 50 makes the central display part 26B of the sign display unit 26 show the 100 km/h limiting speed sign image 27B for a constant period of time in accordance with the display pattern as shown in FIG. 9.

Figure 5:
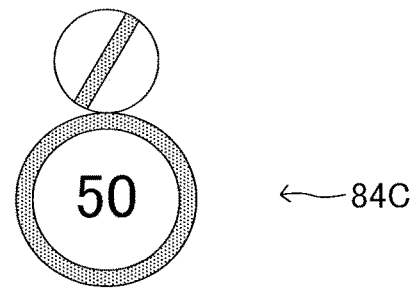
FIG. 5 is a view showing a road sign representing that a restriction on limiting speed of 50 km/h is finished.
Figure 10:
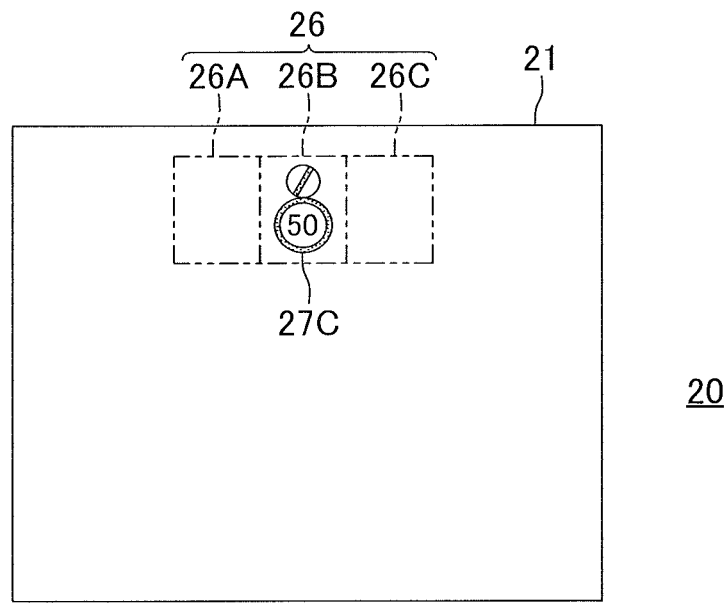
FIG. 10 is a view showing the main display area displaying the road sign image representing that the restriction on limiting speed of 50 km/h is finished.

When the camera control ECU 50 determines that the picked up image data, which is generated by the camera 51 and represents a road sign 84, is coincident with the road sign image data representing the end of 50 km/h limiting speed sign 84C (see FIG. 5. The road sign representing the end of the restriction on 50 km/h limiting speed) corresponding to the end of 50 km/h limiting speed sign image 27C in the road sign database, the camera control ECU 50 makes the central display part 26B of the sign display unit 26 show the end of 50 km/h limiting speed sign image 27C for a constant period of time in accordance with the display pattern as shown in FIG. 10.

Figure 6:
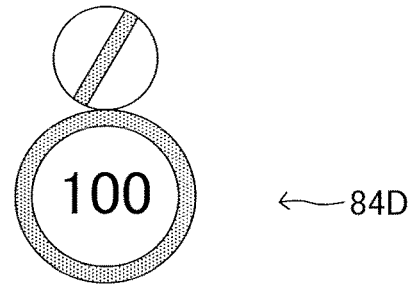
FIG. 6 is a view showing a road sign representing that a restriction on limiting speed of 100 km/h is finished.

When the camera control ECU 50 determines that the picked up image data, which is generated by the camera 51 and represents a road sign 84, is coincident with the road sign image data representing the end of 100 km/h limiting speed sign 84D (see FIG. 6. The road sign representing the end of the restriction on 100 km/h limiting speed), the camera control ECU 50 makes the central display part 26B of the sign display unit 26 show a road sign image (not shown) corresponding to this road signs 84 for a constant period of time in accordance with the display pattern.

Figure 9:
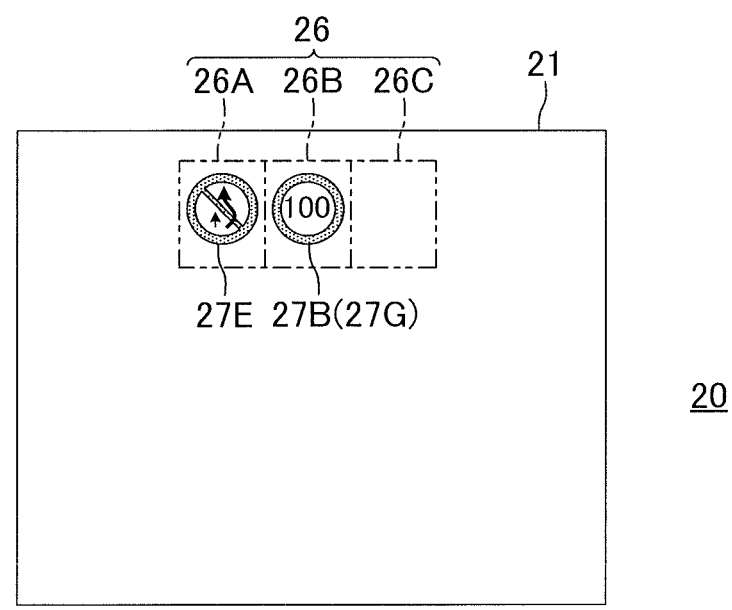
FIG. 9 is a view showing the main display area displaying a road sign image representing that the limiting speed is 100 km/h.

Additionally, when the camera control ECU 50 determines that the picked up image data, which is generated by the camera 51 and represents a road sign 84, is coincident with the road sign image data representing a No overtaking sign (not shown) corresponding to the No overtaking sign image 27E in the road sign database, the camera control ECU 50 makes the left side display part 26A of the sign display unit 26 show the No overtaking sign image 27E for a constant period of time in accordance with the display pattern as shown in FIGS. 8 and 9.

When a limiting speed regulating sign image (for example, the 50 km/h limiting speed sign image 27A or the 100 km/h limiting speed sign image 27B) is displayed on the central display part 26B of the sign display unit 26, the driver can recognize the limiting speed for the road 80 by looking at the sign display unit 26.

On the other hand, when a limiting speed regulating sign image is not displayed on the central display part 26B, the driver cannot recognize the limiting speed for the road 80, on which the targeted vehicle 10 is running, by looking at the sign display unit 26.

The limiting speed for each of the roads is individually regulated for each attribute (type) of the road by the traffic law of Japan. The driver may know the limiting speed for the road 80 where the targeted vehicle 10 is running. In this case, even when a limiting speed regulating sign image is not displayed on the central display part 26B, the driver does not have difficulty in operating the targeted vehicle 10 while obeying the limiting speed.

On the other hand, in the case where the driver does not know the limiting speed for the road 80 on which the targeted vehicle 10 is running, when the limiting speed regulating sign image is not displayed on the central display part 26B, there is a risk that it is difficult for the driver to operate the targeted vehicle 10.

Then, when a limiting speed regulating sign image is not displayed on the central display part 26B, the camera control ECU 50 determines that the road sign image data representing the road sign image displayed on the central display part 26B does not include the limiting speed information, and obtains the road attribute information of the road 80 from the map image data representing the map image displayed on the second display means 62 via the GPS control ECU 60 at every constant time. Namely, the camera control ECU 50 obtains the road attribute information from the image data of the part of the map image, which is indicated by the position information (namely, this image data is the image data indicating the road 80.).

In addition, as described above, the camera control ECU 50 obtains the country information on the country (where the road 80 is located) every time when receiving the country code from the GPS control ECU 60.

Every time the camera control ECU 50 acquires the road attribute information from the GPS control ECU 60, the camera control ECU 50 applies the country information obtained based on the country code and the road attribute information to the map for estimating limiting speed 86.

FIG. 12 is an example of the map for estimating limiting speed 86. This map for estimating limiting speed 86 represents that the limiting speed for each of main lanes of highways in Japan is 100 km/h and the limiting speed for each of general roads of Japan is 60 km/h.

Then, for example, when the country specified by the camera control ECU 50 is "Japan" and the road attribute information obtained by the camera control ECU 50 from the GPS control ECU 60 represents "a general road", the camera control ECU 50 estimates that "the limiting speed for the road 80 is 60 km/h" based on the map for estimating limiting speed 86.

Figure 11:
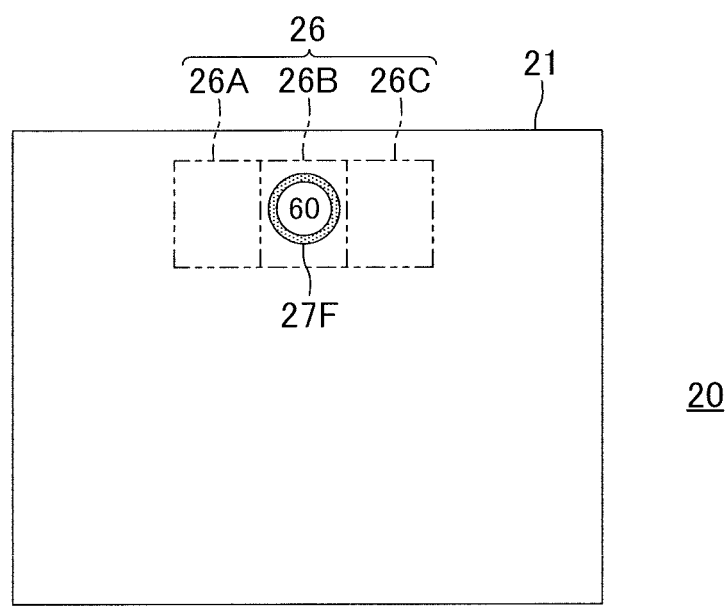
FIG. 11 is a view showing the main display area displaying an estimated limiting speed sign image.

Then, the camera control ECU 50 makes the central display part 26B show the estimated limiting speed sign image 27F (the road sign image representing that the limiting speed is 60 km/h) as shown in FIG. 11.

The driver of the targeted vehicle 10 can recognize that "the limiting speed for the road 80 is 60 km/h" by looking at the sign display unit 26. In this case, the driver does not difficulty in driving the targeted vehicle 10 while obeying the limiting speed.

The limiting speed (60 km/h) estimated in such a manner is the estimated limiting speed.

Furthermore, the camera control ECU 50 may estimate the limiting speed for the road 80 in consideration of the reliability of the road attribute information.

The position information sent from the GPS satellite to the GPS receiver 61 may contain errors. That is, the correct position of the road 80 corresponding to the position information acquired by the camera control ECU 50 is usually slightly shifted from (spaced from) the position indicated by the position information acquired by the camera control ECU 50.

Then, for example, when a highway (a main lane) and a general road are provided close to each other, even though the targeted vehicle 10 is actually located on the highway (the main lane), the camera control ECU 50 is likely to determine that "the road 80 is a general road".

Further, for example, when a highway is located directly above a general road, the position information representing the general road and the position information representing the highway are substantially identical. In other words, in this case, this general road and this highway cannot be distinguished from each other based on the position information.

Then, information on "the matching accuracy" may be added to (embedded in) the road attribute information included in the image data that represents some of the roads in the map image.

This matching accuracy represents the accuracy of the road attribute information. When a highway is located directly above a general road, the matching accuracy of this general road and the matching accuracy of this highway are extremely low. On the other hand, when no other road exists around a road, the matching accuracy of this road is high.

The camera control ECU 50 may be configured to apply road attribute information, to which the information on the matching accuracy is added, (and the country information) to the map for estimating limiting speed 86 only when the matching accuracy is equal to or greater than a predetermined threshold.

The camera control ECU 50 may be configured to apply the road attribute Information sent from the GPS control ECU 60 to the map for estimating limiting speed 86 only when the targeted vehicle 10 on a main lane of a highway or a general road continuously runs a distance equal to or more than a predetermined distance represented by the predetermined threshold. In other words, the camera control ECU 50 may be configured to estimate the limiting speed for the road 80 by applying the road attribute information (and the country information) to the map for estimating limiting speed 86 only when the camera control ECU 50 receives the same road attribute information from the GPS control ECU 60 consecutive times equal to or more than a certain number.

"The distance that the targeted vehicle 10 has traveled while the camera control ECU 50 receives the same road attribute information from the GPS control ECU 60 consecutive times (hereinafter this distance is referred to as "cumulative value")" can be calculated by the camera control ECU 50. That is, the camera control ECU 50 repeatedly acquires the road attribute information from the GPS control ECU 60 at a constant time interval (hereinafter, this time interval is referred to as "acquisition interval"). The camera control ECU 50 calculates a moving distance, which is a distance the targeted vehicle 10 runs during each acquisition interval, based on the information on the rotation speed obtained from the brake control ECU 35 and the acquisition interval. In addition, when the road attribute information acquired from the GPS control ECU 60 at an acquisition time (a predetermined acquisition time) is the same as the road attribute information acquired at a previous acquisition time (which is an acquisition time immediately before the predetermined acquisition time), the camera control ECU 50 calculates the cumulative value of the moving distance by adding the moving distance of the targeted vehicle 10, which is calculated this time, to the total value of the moving distance of the targeted vehicle 10, which has been already calculated. On the other hand, when the road attribute information acquired from the GPS control ECU 60 at an acquisition time is different from the road attribute information acquired at a previous acquisition time, the camera control ECU 50 sets the total value of the moving distance, which has been already calculated, to "0 (zero)" and newly calculates the cumulative value.

The camera control ECU 50 can determine whether or not the country where the targeted vehicle 10 is currently located is Japan based on the picked up image data of the camera 51 in place of the position information and the country code sent from the GPS control ECU 60.

For example, when Japanese character is included in the picked up image data of the camera 51, the camera control ECU 50 can determine that "the country where the road 80 is located is Japan".

However, the accuracy for specifying country by this method is lower than the accuracy for specifying country when using the position information and the country code. Then, the camera control ECU 50 may be configured to estimate the limiting speed for the road 80 based on this determination result (country information), the road attribute information, and the map for estimating limiting speed 86 by using this method, only when Japanese words, whose number is equal to or more than a predetermined number, are included in the picked up image data acquired by the camera control ECU 50 for a constant period of time.

However, when receiving the position information from the GPS control ECU 60, the camera control ECU 50 preferably estimates the limiting speed for the road 80 using the position information instead of the picked up image data.

Figure 13:
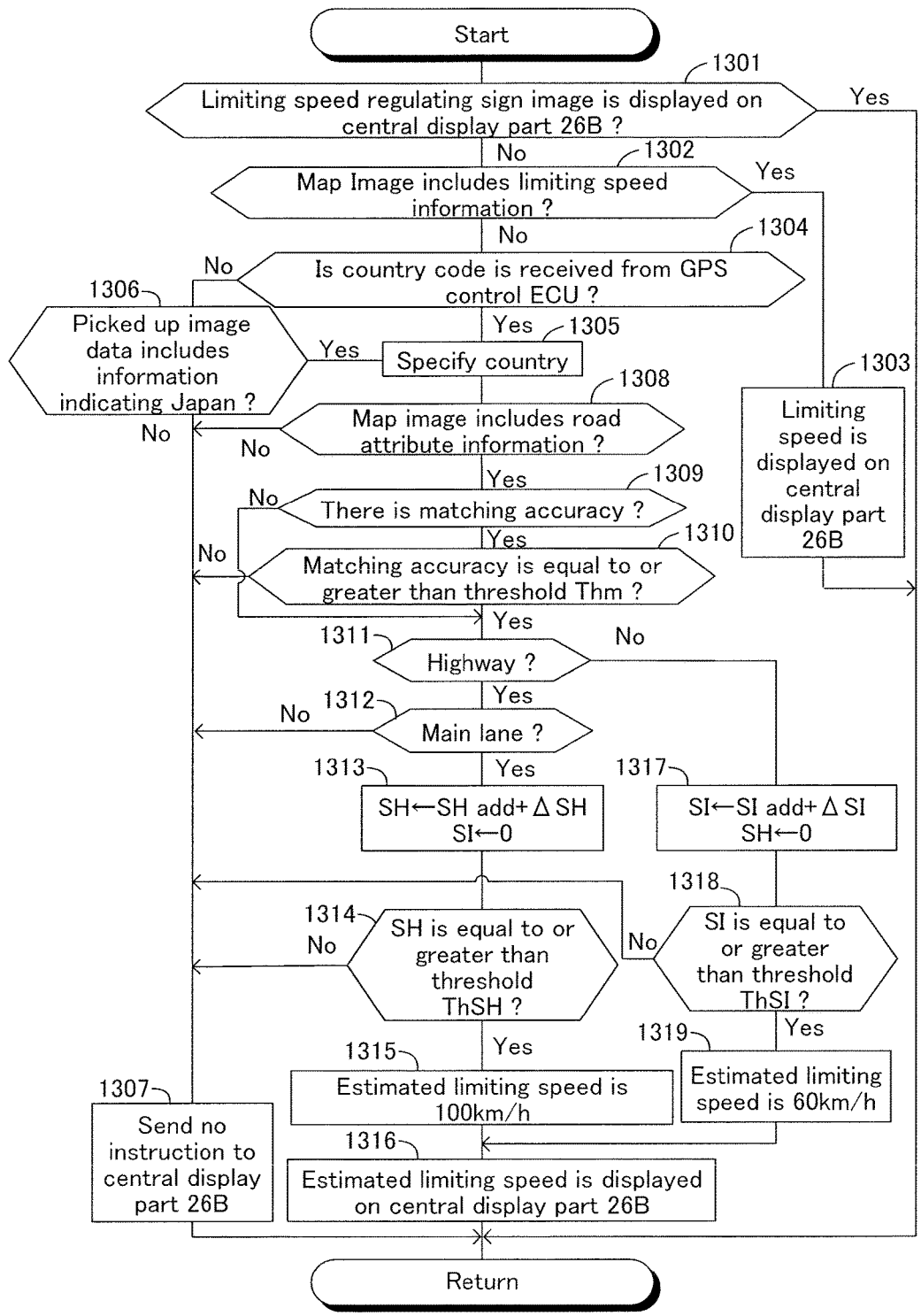
FIG. 13 is a flow chart showing a limiting speed display processing executed by a camera control ECU.

Next, with reference to the flowcharts of FIGS. 13 and 14, the operation of the limiting speed display device for vehicle 100 of the targeted vehicle 10 running on the road 80 in Japan will be described.

When the ignition key (not shown) is operated, electric power source (not shown) of the targeted vehicle 10 supplies the first display means 20, the vehicle control ECU 30, the wheel speed sensors 37, the drive support ECU, the engine control ECU 31, the accelerator operation quantity sensor 32, the brake control ECU 35, the brake operation quantity sensor 36, the sensor ECU 40, the radar sensor 41, the camera control ECU 50, the camera 51, the GPS control ECU 60, the GPS receiver 61 and the second display means 62 with electricity and the engine is started. Then, the camera control ECU 50 repeatedly executes the routine shown in the flowchart of FIG. 13.

First, at step 1301, the camera control ECU 50 determines whether or not a limiting speed regulating sign image is displayed on the central display part 26B of the sign display unit 26.

For example, when the 50 km/h limiting speed sign image 27A or the 100 km/h limiting speed sign image 27B is displayed on the central display part 26B as shown in FIGS. 8 and 9, the driver can recognize the limiting speed for the road 80 by looking at the central display part 26B. In this case, the camera control ECU 50 determines Yes and temporarily ends this routine.

On the other hand, when a limiting speed regulating sign image is not displayed on the central display part 26B, the camera control ECU 50 proceeds to step 1302. For example, as shown in FIG. 10, when the end of 50 km/h limiting speed sign image 27C corresponding to the end of 50 km/h limiting speed sign 84C is displayed on the central display part 26B, the camera control ECU 50 proceeds to step 1302.

Then, the camera control ECU 50 determines whether or not the image data corresponding to the road 80 in the map image displayed on the second display means 62 includes the limiting speed information.

When determining Yes at step 1302, the camera control ECU 50 proceeds to step 1303 to make the central display part 26B show the road sign image corresponding to this limiting speed information. For example, when the road 80 is a general road and the image data representing the road 80 in the map image includes a limiting speed information representing that "the limiting speed is 60 km/h", the camera control ECU 50 makes the central display part 26B show the estimated limiting speed sign image 27F as shown in FIG. 11.

On the other hand, when determining No at step 1302, the camera control ECU 50 proceeds to step 1304 to determine whether or not the country code is included in the data received from the GPS control ECU 60 (the GPS receiver 61).

When determining Yes at step 1304, the camera control ECU 50 proceeds to step 1305 to determine that the country where the road 80 is provided is Japan based on the country code received from the GPS receiver 61 and the data for collating country code recorded on the memory of the camera control ECU 50.

On the other hand, when determining No at step 1304, the camera control ECU 50 proceeds to step 1306 to determine whether or not the information indicating that the country where the road 80 is Japan is included in the picked up image data captured by the camera 51.

For example, when the picked up image data includes a signboard on which Japanese characters are painted, the camera control ECU 50 determines Yes at step 1306 and proceeds to step 1305 to determine that the country where the road 80 is installed is Japan.

On the other hand, when determining No at step 1306, the camera control ECU 50 proceeds to step 1307.

In this way, when a determination that the country, where the road 80 is located, is Japan based on the position information from the GPS satellite and the picked up image data captured by the camera 51 can be made, the limiting speed for the road 80 cannot be estimated based on the map for estimating limiting speed 86.

In this case, the camera control ECU 50 does not make the central display part 26B show the limiting speed. In other words, the camera control ECU 50 gives no instruction to the central display part 26B. When, for example, the end of 50 km/h limiting speed sign image 27C is displayed on the central display part 26B at the time before the processing of step 1307, the camera control ECU 50 leaves the central display part 26B alone.

The camera control ECU 50, which has finished the processing of step 1305, proceeds to step 1308 to determine whether or not the image data corresponding to the road 80 in the map image includes the road attribute information.

When determining Yes at step 1308, the camera control ECU 50 proceeds to step 1309 to determine whether or not the information on "the matching accuracy" is added to the road attribute information.

When determining Yes at step 1309, the camera control ECU 50 proceeds to step 1310 to determine whether or not the matching accuracy is equal to or greater than the threshold Thm recorded on the memory of the camera control ECU 50.

When determining Yes at step 1310, this road attribute information is considered reliable. Then, the camera control ECU 50 proceeds to step 1311.

When a No determination is made at step 1309, the camera control ECU 50 proceeds to step 1311.

The camera control ECU 50 that has proceeded to step 1311 determines whether or not the road attribute information indicates that "the road 80 is a highway". In other words, the camera control ECU 50 determines whether or not this road attribute information represents one of "a main lane of a highway" and "an area different from a main lane of a highway".

When determining Yes at step 1311, the camera control ECU 50 proceeds to step 1312 to determine whether or not the road 80 is a main lane of a highway.

When determining Yes at step 1312, the camera control ECU 50 proceeds to step 1313.

Then, the camera control ECU 50 obtains the cumulative value SH of the moving distance of the targeted vehicle 10 on the main lane at the current time by adding ASH to SHadd. Noted that, ASH is the moving distance of the targeted vehicle 10 on the main lane of the highway, which has measured from the previous processing time of the step 1308 to the current processing time of step 1308. The SHadd is the cumulative value of the moving distance of the targeted vehicle 10 on the main lane up to the current time.

Furthermore, the camera control ECU 50 sets the cumulative value SI of the moving distance of the targeted vehicle 10, which will be described later, to "0 (zero)".

The camera control ECU 50 that has finished the processing of step 1313 proceeds to step 1314 to compare the cumulative value SH with the threshold ThSH recorded on the memory of the camera control ECU 50. This threshold ThSH represents a predetermined distance. Namely, at step 1314 the camera control ECU 50 determines whether or not the cumulative value SH is equal to or greater than this predetermined distance (e.g., 1 km).

When determining Yes at step 1314, the camera control ECU 50 proceeds to step 1315 to apply the country information that "the country where the road 80 is installed is Japan" acquired at step 1305 and the information that "the road 80 is a main lane of a highway" to the map for estimating limiting speed 86. The camera control ECU 50 estimates that "the limiting speed for the road 80 is 100 km/h".

Then, the camera control ECU 50 proceeds to step 1316 to makes the central display part 26B show the estimated limiting speed sign image 27G (the sign image same as the 100 km/h limiting speed sign image 27B) as shown in FIG. 9. That is, when a road sign image other than the estimated limiting speed sign image 27G is displayed on the central display part 26B at the processing time of the step 1315, the camera control ECU 50 makes the central display part 26B show the estimated limiting speed sign image 27G in place of this road sign image. Furthermore, when no road sign image is displayed on the central display part 26B, the camera control ECU 50 makes the central display part 26B show the estimated limiting speed sign image 27G.

On the other hand, when determining No at step 1311, the camera control ECU 50 proceeds to step 1317.

Then, the camera control ECU 50 obtains the cumulative value SI of the moving distance of the targeted vehicle 10 on a general road at the current time by adding ASI to Sladd. Noted that, the ASI is the moving distance of the targeted vehicle 10 on the general road, which has measured from the previous processing time of the step 1308 to the current processing time of the step 1308. The Sladd is the cumulative value of the moving distance of the targeted vehicle 10 on the general road up to the current time.

In addition, the camera control ECU 50 sets the cumulative value SH of the moving distance of the targeted vehicle 10 on the highway to "0 (zero)".

The camera control ECU 50 that has finished the processing of step 1317 proceeds to step 1318 to compare the cumulative value SI with the threshold ThSI recorded on the memory of the camera control ECU 50. This threshold ThSI represents a predetermined distance. Namely, at step 1318 the camera control ECU 50 determines whether or not the cumulative value SI is equal to or greater than this predetermined distance (e.g., 1 km).

When determining Yes at step 1318, the camera control ECU 50 proceeds to step 1319 to apply the country information that "the country where the road 80 is installed is Japan" specified at step 1305 and the information that "the road 80 is a general road" to the map for estimating limiting speed 86. The camera control ECU 50 estimates that "the limiting speed for the road 80 is 60 km/h".

Then, the camera control ECU 50 proceeds to step 1316 to make the central display part 26B show the estimated limiting speed sign image 27F as shown in FIG. 11. Namely, when a road sign image other than the estimated limiting speed sign image 27F is displayed on the central display part 26B at the processing time of step 1319, the camera control ECU 50 makes the central display part 26B show the estimated limiting speed sign image 27F in place of this road sign image. Furthermore, when no road sign image is displayed on the central display part 26B, the camera control ECU 50 makes the central display part 26B show the estimated limiting speed sign image 27F.

On the other hand, when determining No at steps 1310, 1312, 1314, or 1318, the camera control ECU 50 proceeds to step 1307.

The camera control ECU 50, which has finished the processing of steps 1303, 1307 or 1316, temporarily ends this routine.

Figure 14:
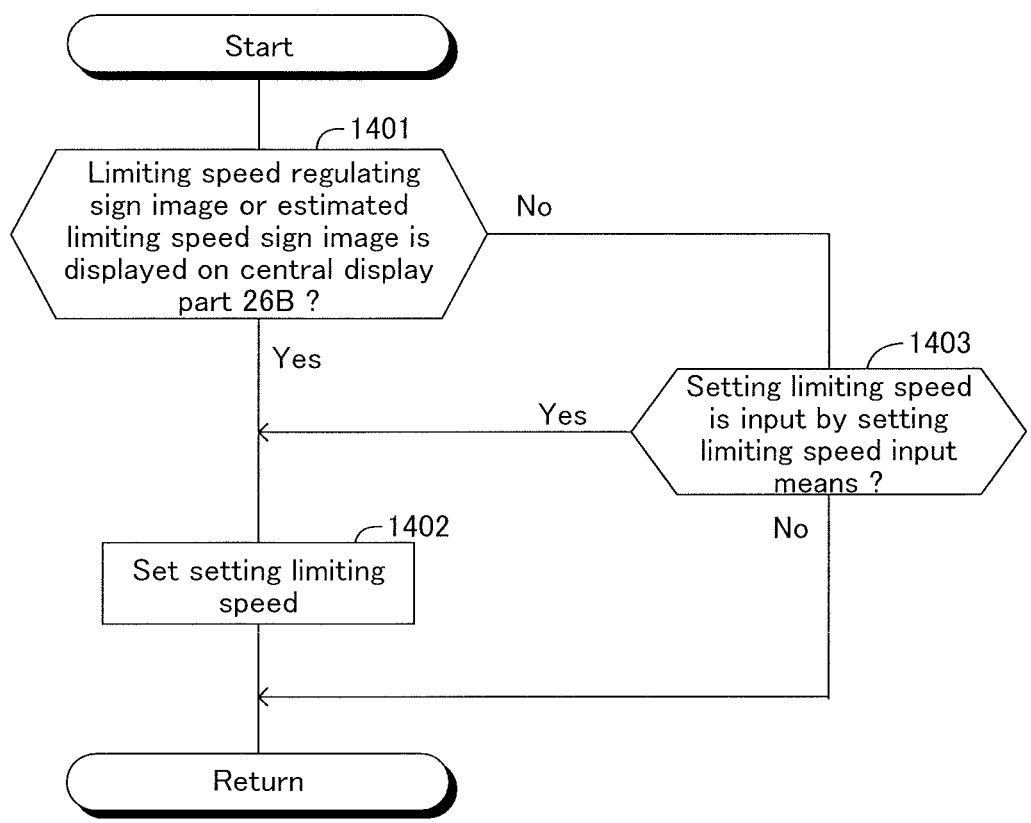
FIG. 14 is a flowchart showing a limiting speed setting processing for ACC control executed by a vehicle control ECU.

Furthermore, when the ignition key is operated, the vehicle control ECU 30 repeatedly executes the routine shown in the flowchart of FIG. 14.

First, at step 1401, the vehicle control ECU 30 determines whether or not a limiting speed regulating sign image or an estimated limiting speed sign image is displayed on the central display part 26B.

When determining Yes at step 1401, the vehicle control ECU 30 proceeds to step 1402 to sets the setting limiting speed to the limiting speed indicated by the image data representing the limiting speed regulating sign image or the estimated limiting speed sign image, which is being displayed on the central display part 26B.

On the other hand, when determining No at step 1401, the vehicle control ECU 30 proceeds to step 1403 to determine whether or not the setting limiting speed is input by the setting limiting speed input means.

When determining Yes at step 1403, the vehicle control ECU 30 proceeds to step 1402 to set the setting limiting speed to the value input by the setting limiting speed input means.

When determining No at step 1403 and when finishing processing of step 1402, the vehicle control ECU 30 temporarily ends this routine.

Next, the limiting speed display device for vehicle according to a second embodiment of the present invention will be described mainly with reference to FIGS. 15 through 20. The same reference numerals are given to the same members as those in the first embodiment.

The road 80 described later in the description of the second embodiment is installed in a country of Europe.

Furthermore, the map image data recorded on the memory of the GPS control ECU 60 represents the map of Europe.

The map for estimating limiting speed 87 for Europe shown in FIG. 17 is recorded on the memory of the camera control ECU 50.

The map for estimating limiting speed 87 represents the limiting speed for each attribute of the road. These limiting speeds are regulated by the traffic law of each of European countries.

For example, the map for estimating limiting speed 87 regulates the limiting speed (the estimated limiting speed) of each of roads in Belgium and France.

In this map for estimating limiting speed 87, the attribute of each of the roads in Belgium and France is defined by one of four attributes (Motorway, Expressway, Non-urban road, and Urban road).

The road signs 84 used in European countries are different from the road signs used in Japan.

Figure 15:
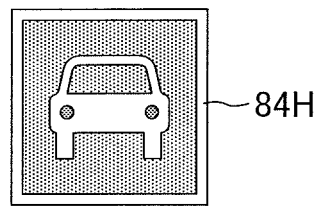
FIG. 15 is a view showing a road sign which represents an expressway of France and is used in a second embodiment of the present invention.

An Expressways sign 84H shown in FIG. 15 is a road sign that represents an Expressway and is used in France. The Expressways sign 84H is the road sign to inform the occupant of the vehicle that an Expressway is installed in front of the place where it is installed.

Figure 16:
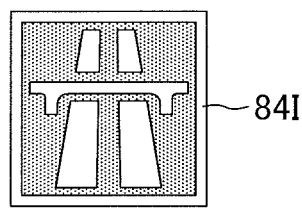
FIG. 16 is a view showing a road sign representing a motorway of France.

A Motorway sign 84I shown in FIG. 16 is a road sign that represents a Motorway and is used in France. The Motorway sign 84I is the road sign to inform the occupant of the vehicle that a Motorway is installed in front of the place where it is installed.

Namely, the Expressways sign 84H and the Motorway sign 84I represent the road attribute information.

The road signs used in European countries include a lot of types of road signs 84. The road signs 84 include a regulation sign, an instruction sign, a guide sign and a warning sign.

The Expressways sign 84H and the Motorway sign 84I are the guide signs.

A display pattern is recorded on the memory of the camera control ECU 50.

This display pattern defines a correspondence relationship between each of the road sign images and each of the left side display part 26A, the central display part 26B, and the right side display part 26C. The correspondence relationship defined by this display pattern of the present embodiment is as follows: the left side display part 26A shows the road sign images corresponding to some of the regulation signs (for example, the No overtaking sign image 27J described later), the central display part 26B shows the road sign images corresponding to some of the speed-related signs and the guide sign (for example, a Motorway sign image 27I and an estimated limiting speed sign image 27L which will be described later), and the right side display part 26C shows the road sign images corresponding to speed-auxiliary signs (for example, the limiting speed for rainy weather sign image 27K described later).

Figure 18:
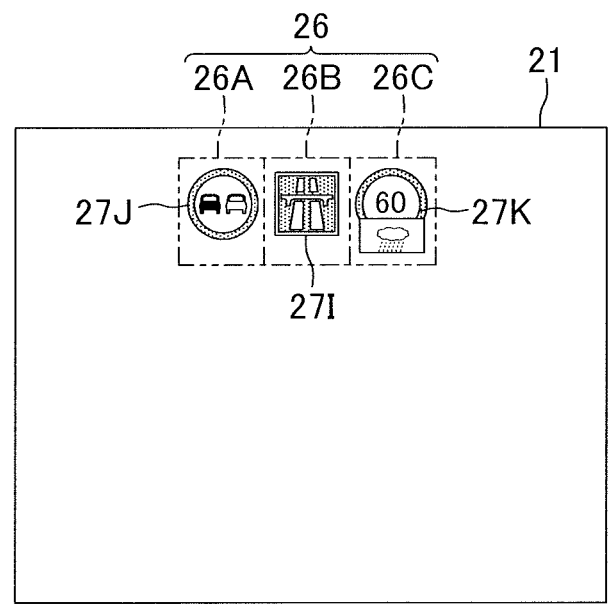
FIG. 18 is a view showing the main display area displaying a road sign image representing the motorway of France.

For example, when the camera 51 of the targeted vehicle 10 running on the road 80, which is a Non-urban road installed in France, images a No overtaking sign (not shown) and a limiting speed for rainy weather sign (not shown), as shown in FIG. 18, the camera control ECU 50 makes the left side display part 26A show the No overtaking sign image 27J and makes the right side display part 26C show the limiting speed for rainy weather sign image 27K according to the display pattern.

Further, when the camera 51 images the Motorway sign 84I, as shown in FIG. 18, the camera control ECU 50 makes the central display part 26B show the Motorway sign image 27I corresponding to the Motorway sign 84I.

However, the Motorway sign image 27I is not the limiting speed regulating sign image but a road sign image representing the attribute of the road. Then, the driver of the targeted vehicle 10 cannot recognize the limiting speed for the road 80 by looking at the sign display unit 26 showing the Motorway sign image 27I.

In Europe, the targeted vehicle 10 may run a road across two countries adjacent to each other. That is, the targeted vehicle 10 may run not only a road of a country where the driver resides but also a road of a country where the driver does not reside. In general, a driver is unlikely to know the traffic law of the country where he/she does not reside. When the targeted vehicle 10, whose sign display unit 26 is not displaying the information representing the limiting speed, runs more than one country, the driver is not likely to be able to recognize the limiting speed for the road 80.

Then, when the camera 51 images the road sign representing the attribute of the road (in other words, when the limiting speed regulating sign image is not displayed on the central display part 26B), the camera control ECU 50 determines that the road sign image data representing the road sign image displayed on the central display part 26B does not include the limiting speed information and acquires the road attribute information from this road sign image data. Namely, for example, when the camera 51 images the Motorway sign 84I, the camera control ECU 50 recognizes that a Motorway exists in front of the road 80 based on the Motorway sign image 27I.

Every time the camera control ECU 50 acquires the road attribute information, the camera control ECU 50 applies country information on the country specified based on the country code and the road attribute information to the map for estimating limiting speed 87.

Thus, for example, when the country identified by the camera control ECU 50 is "France" and the road attribute information acquired by the camera control ECU 50 represents "Motorway", the camera control ECU 50 estimates that "the limiting speed for the road 80 is 130 km/h" on the basis of the map for estimating limiting speed 87.

Figure 19:
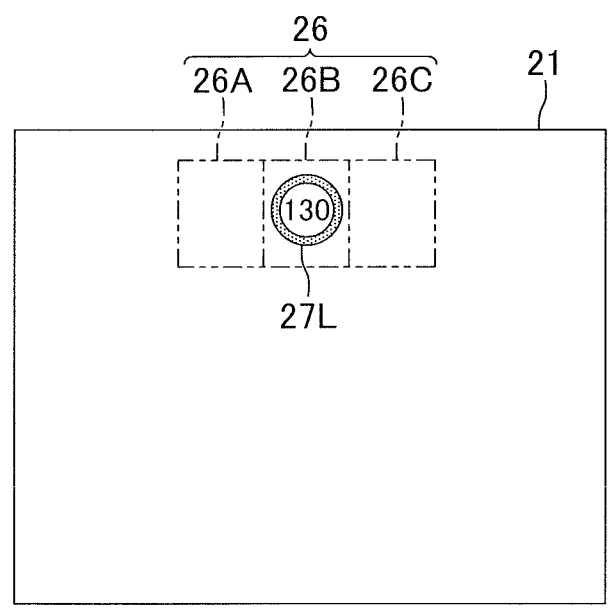
FIG. 19 is a view showing the main display area displaying an estimated limiting speed sign image representing the limiting speed for the motorway of France.

As shown in FIG. 19, the camera control ECU 50 makes the central display part 26B show an estimated limiting speed sign image 27L (the road sign image indicating that the limiting speed is 130 km/h).

Additionally, for example, when the country identified by the camera control ECU 50 is "Belgium" and the road attribute information acquired by the camera control ECU 50 represents "Non-urban road", the camera control ECU 50 estimates that "the limiting speed for the road 80 is 90 km/h" on the basis of the map for estimating limiting speed 87.

Further, the camera control ECU 50 makes the central display part 26B show an estimated limiting speed sign image (not shown) indicating that the limiting speed is 90 km/h.

Then, even if the limiting speed regulating sign image is not displayed on the sign display unit 26, the driver of targeted vehicle 10, which is running on a road 80 in a country where the driver does not reside, can recognize the limiting speed for the road 80 by looking at the estimated limiting speed sign image displayed on sign display unit 26.

Next, with reference to the flowchart of FIG. 20, the operation of the limiting speed display device for vehicle 100 of the targeted vehicle 10 running on the road 80 of France will be described.

Noted that, the road attribute information is not included in the map image data representing the map image displayed on the second display means 62 of this targeted vehicle 10.

Figure 20:
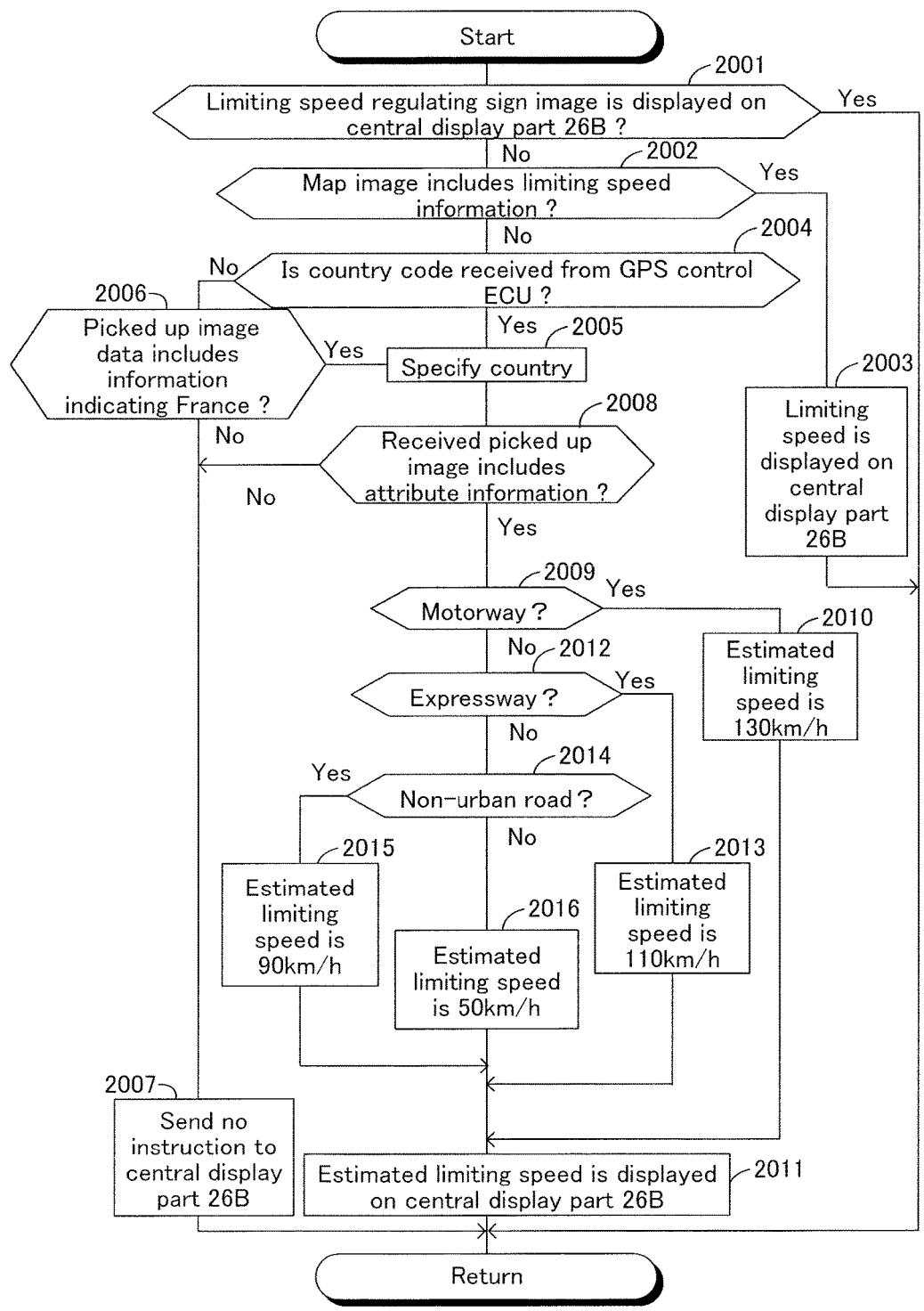
FIG. 20 is a flow chart showing a limiting speed display processing executed by the camera control ECU when the targeted vehicle runs on a road of France.

When the ignition key is operated, the camera control ECU 50 repeatedly executes the routine shown in the flowchart of FIG. 20.

The processing of steps 2001 to 2007 is the same as those of steps 1301 to 1307.

However, at step 2005, the camera control ECU 50 identifies that the country where the road 80 is installed is France. Further, at step 2006, the camera control ECU 50 determines whether or not information indicating France is included in the picked up image data.

Additionally, for example, when the camera 51 images the Motorway sign 84I, in the processing of step 2007, the camera control ECU 50 makes the central display part 26B show the Motorway sign image 271 as shown in FIG. 18.

The camera control ECU 50, which has finished the processing of step 2005, proceeds to step 2008 to determine whether or not the picked up image data picked up by the camera 51 includes the road attribute information.

When determining Yes at step 2008, the camera control ECU 50 proceeds to step 2009 to determine whether or not the road attribute information represents "Motorway".

When determining Yes at step 2009, the camera control ECU 50 proceeds to step 2010 to apply the country information that "the country where the road 80 is installed is France" and the information that "the road 80 is a Motorway" to the map for estimating limiting speed 87. Then, the camera control ECU 50 estimates that "the limiting speed for the road 80 is 130 km/h".

Further, the camera control ECU 50 proceeds to step 2011 to makes the central display part 26B show the estimated limiting speed sign image 27L, which is an estimated limiting speed sign image representing that the limiting speed is 130 km/h (see FIG. 19). That is, when a road sign image other than the estimated limiting speed sign image 27L is displayed on the central display part 26B at the processing time of step 2010, the camera control ECU 50 makes the central display part 26B show the estimated limiting speed sign image 27L in place of this road sign image. Additionally, when no road sign image is displayed on the central display part 26B, the camera control ECU 50 makes the central display part 26B show the estimated limiting speed sign image 27L.

When determining No at step 2009, the camera control ECU 50 proceeds to step 2012 to determine whether or not this road attribute information represents "Expressway".

When determining Yes at step 2012, the camera control ECU 50 proceeds to step 2013 to apply the country information that "the country where the road 80 is installed is France" specified at 2005 and the information that "the road 80 is an Expressway" to the map for estimating limiting speed 87. Then, the camera control ECU 50 estimates that "the limiting speed for the road 80 is 110 km/h".

Further, the camera control ECU 50 proceeds to step 2011 to make the central display part 26B show an estimated limiting speed sign image (not shown) indicating that the limiting speed is 110 km/h. Namely, when a road sign image other than this estimated limiting speed sign image is displayed on the central display part 26B at the processing time of step 2013, the camera control ECU 50 makes the central display part 26B show this estimated limiting speed sign image in place of this road sign image. Additionally, when no road sign image is displayed on the central display part 26B, the camera control ECU 50 makes the central display part 26B show this estimated limiting speed sign image.

When determining No at step 2012, the camera control ECU 50 proceeds to step 2014 to determine whether or not the road attribute information represents "Non-urban road".

When determining Yes at step 2014, the camera control ECU 50 proceeds to step 2015 to apply the country information that "the country where the road 80 is installed is France" specified at step 2005 and the information that "the road 80 is Non-urban road" to the map for estimating limiting speed 87. Then, the camera control ECU 50 estimates that "the limiting speed for the road 80 is 90 km/h".

Further, the camera control ECU 50 proceeds to step 2011 to make the central display part 26B show an estimated limiting speed sign image (not shown) indicating that the limiting speed is 90 km/h. Namely, when a road sign image other than this estimated limiting speed sign image is displayed on the central display part 26B at the processing time of step 2015, the camera control ECU 50 makes the central display part 26B show this estimated limiting speed sign image in place of this road sign image. Additionally, when no road sign image is displayed on the central display part 26B, the camera control ECU 50 makes the central display part 26B show this estimated limiting speed sign image.

When determining No at step 2014, the camera control ECU 50 proceeds to step 2016.

Then, the camera control ECU 50 applies the country information that "the country where the road 80 is installed is France" specified at step 2005 and the information that "the road 80 is Urban road" to the map for estimating limiting speed 87. Then, the camera control ECU 50 estimates that the limiting speed for the road 80 is 50 km/h.

Further, the camera control ECU 50 proceeds to step 2011 to make the central display part 26B show an estimated limiting speed sign image (not shown) indicating that the limiting speed is 50 km/h. Namely, when a road sign image other than this estimated limiting speed sign image is displayed on the central display part 26B at the processing time of step 2015, the camera control ECU 50 makes the central display part 26B show this estimated limiting speed sign image in place of this road sign image. Additionally, when no road sign image is displayed on the central display part 26B, the camera control ECU 50 makes the central display part 26B show this estimated limiting speed sign image.

The camera control ECU 50, which has finished the processing of steps 2003, 2007 or 2011, temporarily ends this routine.

Further, similarly to the first embodiment, when the ignition key is operated, the vehicle control ECU 30 repeats the processing of the flowchart of FIG. 14.

The present invention is not limited to the above embodiments, and various modifications can be adopted within the scope of the present invention.

In any embodiments, the estimated limiting speed sign image may be displayed on a portion different from the central display part 26B. For example, the estimated limiting speed sign image may be displayed on a portion different from the sign display unit 26 in the first display means 20.

Instead of the GPS control ECU 60 and the GPS receiver 61, the targeted vehicle 10 may be provided with means that can receive information from a satellite of a Global Navigation Satellite System (GNSS) other than GPS (e.g., Galileo) and can exchange data (can communicate) with the camera control ECU 40 and the sensor ECU 50. "The map image data" is recorded on the memory of this means, and this means controls the second display means 62.

The targeted vehicle 10 may be provided with a vehicle-mounted device capable of wireless communicating with a roadside device installed along a road.

As is well known, the roadside device sends a variety of traffic information. The content of this information is the same as the traffic information represented by each of the road signs 84.

Then, the targeted vehicle 10 configured in such a manner can perform pattern matching using the traffic information from the roadside device and the road sign database and can make the display means 20 show a road sign image represented by a road sign image data selected from the road sign database.

The first display means 20 and the second display means 62 may be integrated. In other words, both a region corresponding to the first display means 20 and another region corresponding to the second display means 62 may be formed on one display means.

At least one of the first display means 20 and the second display means 62 may be detachable to the targeted vehicle 10.

Additionally, when integrating the first display means 20 and the second display means 62, the integrated display means may be detachable to the targeted vehicle 10.

In the second embodiment, the image data representing some of the roads in the map image displayed on the second display means 62 of the targeted vehicle 10 may include the road attribute information.

Furthermore, in any embodiments, the "the map image data" may include the country information indicating the country which includes the place where the targeted vehicle 10 is located. In this case, the camera control ECU 50 identifies the country where the targeted vehicle 10 is located based on the map image data and the position information.

A display means for displaying the vehicle speed of the targeted vehicle 10 and/or the road sign image etc. may be provided on portion other than the instrument panel 18 in the targeted vehicle 10.

For example, a wind screen 11 a (refer to the imaginary line in FIG. 2), which is a part of the front window 11 and on which the image generated by a head up display unit (not shown) is projected, may be used as the display means. In this case, a display portion corresponding to at least one of the first display means 20 and the second display means 62 is formed on the wind screen 11a.

What is claimed is:

1. A limiting speed display device for vehicle mounted on a targeted vehicle, said limiting speed display device for vehicle comprising:

a position information receiver capable of receiving position information on said targeted vehicle, said position information transmitted from a satellite of a global navigation satellite system;

map display means for displaying map image including image representing a road on which said targeted vehicle runs by using said position information;

imaging means for generating picked up image data corresponding to a road sign when imaging said road sign;

a memory recording a plurality of road sign image data, each of said road sign image data representing each of road sign images, each of said road sign images corresponding to each of said road signs;

display means for road sign image for displaying said road sign image represented by a coincident data that is one of said road sign image data when said coincident data is coincident with said picked up image data generated by said imaging means;

limiting speed information determining means for determining whether or not limiting speed information that is information on limiting speed of said vehicle for road is included in at least one of map image data representing said map image and said road sign image data representing said road sign image displayed on said display means for road sign image;

road attribute information determining means for determining whether or not road attribute information that is information on attribute of said road is included in said map image data;

distance determining means for determining whether or not a distance is greater than or equal to a predetermined threshold, wherein said targeted vehicle travels said distance while said road attribute information determining means determines that a same road attribute information is included in said map image data a consecutive number of times that is greater than or equal to a certain number;

country information acquiring means for acquiring country information that is information on a country where said road is installed based on one of said picked up image data and said position information;

limiting speed estimation means for estimating limiting speed for said road based only on said country information and said road attribute information when said limiting speed information determining means determines that said limiting speed information is not included and said distance determining means determines that said distance is greater than or equal to said threshold; and limiting speed display means for displaying said limiting speed estimated by said limiting speed estimation means.

2. The limiting speed display device for vehicle according to claim 1, wherein, said limiting speed display means is said display means for road sign image.

3. The limiting speed display device for vehicle according to claim 1, wherein, said limiting speed information determining means is configured to determine that said limiting speed information is not included in said road sign image data representing said road sign image displayed on said display means for road sign image when said imaging means images said road sign indicating that restriction on said limiting speed for said road ends.

4. The limiting speed display device for vehicle according to claim 1, wherein,
said limiting speed information determining means is configured to determine that said limiting speed information is not included in said road sign image data representing said road sign image displayed on said display means for road sign image when said imaging means images said road sign indicating said road attribute information for said road.

5. The limiting speed display device for vehicle according to claim 1, wherein,
said targeted vehicle is provided with an adaptive cruise control controller for controlling said targeted vehicle so as to follow a leading vehicle with speed equal to or less than a predetermined setting limiting speed while maintaining a predetermined inter-vehicle distance with respect to said leading vehicle when said leading vehicle running on said road is positioned in front of said targeted vehicle,
said adaptive cruise control controller is configured to use said limiting speed estimated by said limiting speed estimation means as said setting limiting speed.

6. The limiting speed display device for vehicle according to claim 2, wherein,
said limiting speed information determining means is configured to determine that said limiting speed information is not included in said road sign image data representing said road sign image displayed on said display means for road sign image when said imaging means images said road sign indicating that restriction on said limiting speed for said road ends.

* * * * *